F. A. HART.
CLUTCH.
APPLICATION FILED JUNE 27, 1912.
1,171,403.
Patented Feb. 8, 1916.
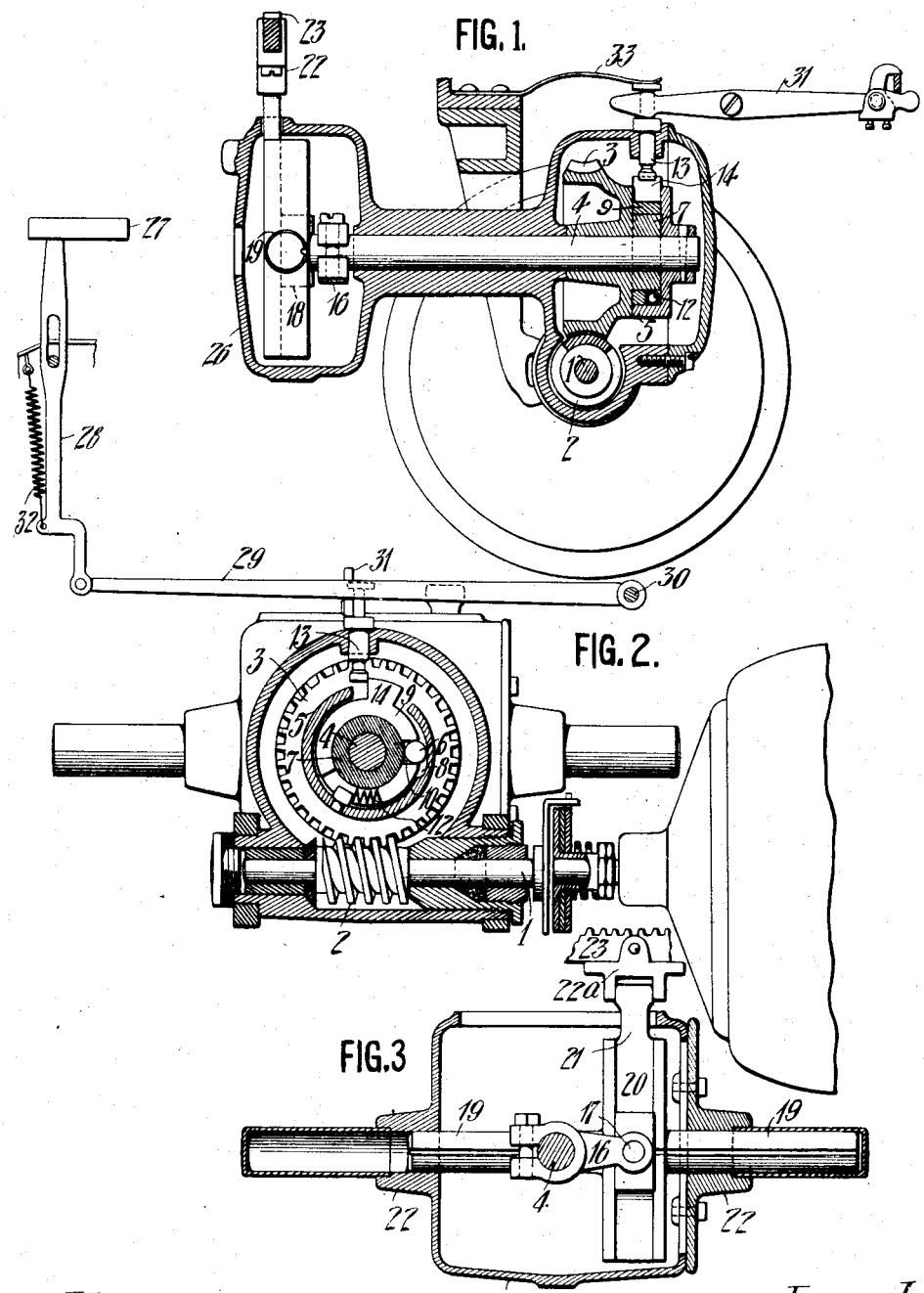

UNITED STATES PATENT OFFICE.

FREDERICK A. HART, OF HARTFORD, CONNECTICUT, ASSIGNOR, BY MESNE ASSIGNMENTS, TO UNDERWOOD COMPUTING MACHINE COMPANY, OF NEW YORK, N. Y., A CORPORATION OF NEW YORK.

CLUTCH.

1,171,403.   Specification of Letters Patent.   Patented Feb. 8, 1916.

Original application filed December 9, 1910, Serial No. 596,451. Divided and this application filed June 27, 1912. Serial No. 706,125.

*To all whom it may concern:*

Be it known that I, FREDERICK A. HART, a citizen of the United States, residing in Hartford, in the county of Hartford and State of Connecticut, have invented certain new and useful Improvements in Clutches, of which the following is a specification.

This invention relates to a clutch mechanism, particularly one adapted for combined typewriting and adding machines.

This application is a division of my application No. 596,451, filed December 9, 1910.

The object of the invention is to produce a simple, inexpensive, reliable, durable and quick-acting self-opening clutch.

In the accompanying drawing, Figure 1 is a sectional view of the clutching mechanism. Fig. 2 is a side sectional view of the clutch, showing the key control. Fig. 3 shows the reciprocating bar and part of the general operator of an adding machine.

On a motor-driven shaft 1 is a worm 2, which rotates a worm-gear 3 loosely mounted upon a cross shaft 4. The constantly rotating worm-gear 3 is intermittently connected to the cross shaft 4, by a clutch comprising a normally stationary cup-like member 5 and a ball 6, which may be caused to jam between said cup 5 and the hub 7 of the worm-gear 3. The ball or roll 6 runs in a hollow or pocket 8 in the inner side of the cup 5. If the ball 6 moves in the direction in which the worm-gear 3 rotates, it jams between the cup 5 and the hub 7, by reason of the inclination or convergence of the pocket or hollow 8 relatively to the contour of the hub.

The ball or clutch member 6 is operated by an annular member or loose collar 9, which surrounds the hub 7 within cup 5, and has a notch 10 in which the ball 6 is loosely confined. A spring 12 constantly forces the annular member 9 forward, tending to move the ball 6 to clutch-closing position, that is to jam the ball between the hub 7 and the narrow portion of the cup 5 and to transmit power to the shaft 4. The clutch is normally held open by a dog or pin 13, which restrains a projection 14 of the rotatable annular member or ring 9, (said projection extending through the cup 5 to engage the pin). The ball 6 lies normally in the pocket 8. This allows the hub 7 to rotate idly. When the pin 13 is withdrawn from the path of the projection 14, the spring 12 advances the ring 9 to shift the ball 6 along the pocket 8 to a narrower portion thereof to close the clutch. When the ball is thus at said narrower portion it jams between the rotating hub 7 and the cup 5 with the result that the clutch is closed, the shaft 4 rotates together with crank 16 thereon, which is pivoted by means of a pin 17 in a block 18 to reciprocate a slide 19. This block 18 reciprocates in a guideway 20 formed in a cross arm 21 forming part of the slide 19. The latter slides in bearings 22 at the ends of a casing 26. The upper end of the cross arm 21 engages a yoke 22ª on the general operator rack 23, in the above-mentioned adding machine, to move the said rack forward and back to turn the dial wheels and otherwise operate the adding mechanism. The clutch is opened by moving the pin 13 into the path of projection 14 of the rotating collar 9, to arrest the same. The ball 6 is thus forced back into the pocket 8, which relieves the jam between hub 7 and cup 5 and allows the worm-gear 3 to rotate idly.

To enable the operator to close the clutch, a key 27 is provided, having a stem 28 pivoted to a bar 29, supported by a pin 30. This bar 29 may be depressed by the key 27 to rock a lever 31, engaging the head of the pin 13, to raise the latter and close the clutch. The key is returned to normal position by springs 32, 33; and this moves the pin 13 into the path of the projection 14 again to open the clutch. The closing of the clutch is brought about when the pin or detent 13 is withdrawn by the spring 12 which throws the roll 14 to the narrow portion of the pocket, where it jams between the sleeve or hub 7 and the cup 5, thus locking said sleeve and cup together.

Variations may be resorted to within the scope of the invention, and portions of the improvements may be used without others.

Having thus described my invention, I claim:

1. The combination with a shaft, of a driving sleeve loose on the shaft, a cup fast on the shaft and embracing said sleeve, a roll between said sleeve and said cup running in a pocket in said cup, a roll carrier for positioning said roll, a lug on said roll carrier extending through a peripheral opening in said cup, and means for detaining said roll carrier by said lug to hold said roll in said pocket.

2. The combination with a driving sleeve, of a shaft on which it is adapted to rotate and which it is adapted to drive, a cup on said shaft embracing a part of said sleeve and forming a pocket therewith, a gripping roll within said pocket, a roll carrier comprising a lug extending beyond the periphery of said cup, a pin normally engaging said lug to hold said roll and said cup idle, and a spring between said roll carrier and said cup adapted to carry said roll to seizing position when said pin is withdrawn.

3. The combination with a driving sleeve, of a shaft on which it is adapted to rotate and which it is adapted to drive, a cup on said shaft embracing a part of said sleeve and forming a pocket therewith, a gripping roll within said pocket, an annular ring having a roll-carrying opening in which said roll moves freely, a lug on said ring extending radially beyond the periphery of said cup, means for holding said lug against turning, and a single spring for said roll effective on said ring and tending to move said ring to carry said roll to effective position.

FREDERICK A. HART.

Witnesses:
F. E. ALEXANDER,
TITUS H. IRONS.

Copies of this patent may be obtained for five cents each, by addressing the "Commissioner of Patents, Washington, D. C."